G. H. SCULLY.
AUTO DRIVEN TRACTOR.
APPLICATION FILED NOV. 28, 1916.
1,348,324. Patented Aug. 3, 1920.
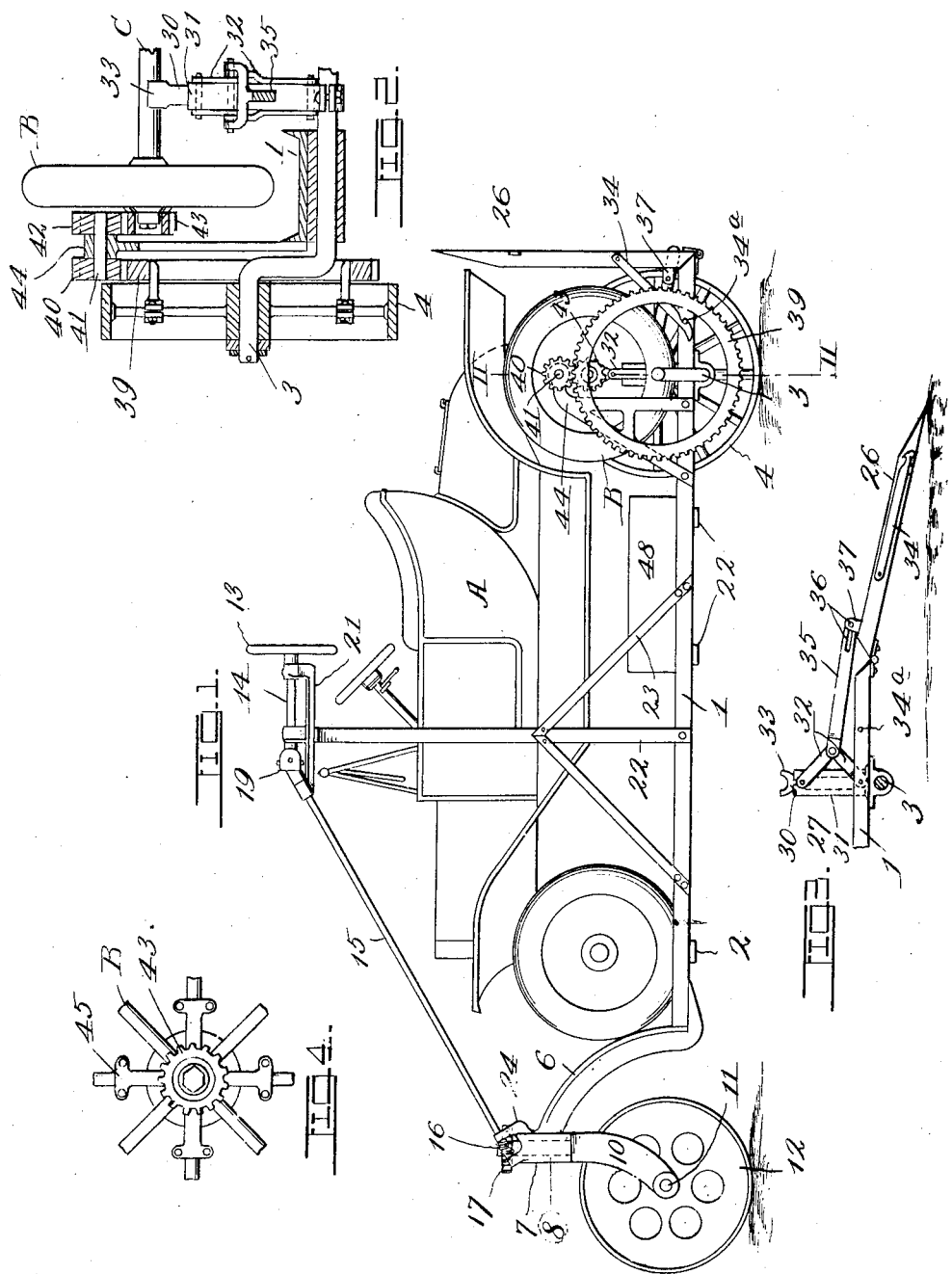

UNITED STATES PATENT OFFICE.

GEORGE H. SCULLY, OF KANSAS CITY, MISSOURI, ASSIGNOR, BY MESNE ASSIGNMENTS, TO AUTOMOTIVE TRACTOR CORPORATION OF AMERICA, OF KANSAS CITY, MISSOURI, A CORPORATION OF MISSOURI.

AUTO-DRIVEN TRACTOR.

1,348,324.   Specification of Letters Patent.   Patented Aug. 3, 1920.

Application filed November 28, 1916. Serial No. 133,844.

*To all whom it may concern:*

Be it known that I, GEORGE H. SCULLY, a citizen of the United States, residing at Kansas City, in the county of Jackson and State of Missouri, have invented certain new and useful Improvements in Auto-Driven Tractors, of which the following is a specification.

My invention relates to an auto driven tractor and my object is to provide a new and useful vehicle of this character adapted to be driven by an automobile mounted thereon.

By mounting the automobile upon the tractor to drive the same, the expense of providing said tractor with its own motor and transmission gear is saved, hence farmers and others who have an automobile and desire a tractor also, can provide themselves with my tractor at a considerable less cost than they could buy the customary tractor provided with its own motor and transmission gear.

In order that the invention may be fully understood, reference will now be made to the accompanying drawings, in which:

Figure 1 is a side elevation of the tractor with an automobile mounted thereon.

Fig. 2 is an enlarged, vertical, sectional view on line II—II of Fig. 1.

Fig. 3 is a side elevation of one of a pair of jacks for jacking up the rear end of the automobile when in position upon the tractor.

Fig. 4 is a broken elevation of the rear wheel of an automobile provided with a gear employed in driving my tractor.

In carrying out the invention, I employ a pair of runways 1, united by transverse bars 2 and a U-shaped rear axle 3, the ends of which are mounted in the hubs of a pair of traction wheels 4, whereby the tractor is propelled.

The forward ends of the runways 1 are carried by a yoke 6 connected at its upper end to a sleeve 7, in which a post 8 is journaled. The lower end of the post 8 is fixed upon a fork 10 mounted upon a front axle 11 carried by a wheel 12, whereby the tractor is guided. The steering of the tractor is accomplished by a steering wheel 13, steering shafts 14 and 15, and a worm and a worm wheel 16 and 17, respectively.

The steering wheel 13 is positioned to be adjacent the driver's seat of the automobile A, when the latter is mounted upon the tractor as disclosed by Fig. 1, so that the driver can readily reach said steering wheel. The steering wheel 13 is fixed upon one end of the shaft 14, which is connected at its opposite end to the upper end of the shaft 15 by a universal joint 19. The shaft 14 and the upper end of the shaft 15 are journaled in a bracket 21, secured to the upper portion of an arch 22 fixed at its lower ends to the runways 1 and reinforced by braces 23. The lower end of the shaft 15 upon which the worm 16 is fixed is journaled in bearings 24 at the upper end of the sleeve 7. The worm wheel 17, which intermeshes with the worm 16, is fixed to the upper end of the post 8 to rotate the same and guide the front wheel 12 when the steering wheel 13 is rotated either to the right or left.

26 designates a tail gate hinged to the rear ends of the runways and which is lowered to the ground as disclosed by Fig. 2, to provide an incline whereby the automobile may reach and leave the runways 1. Said tail gate 26 also controls a pair of jacks 27, whereby the rear axle (or its housing) of the automobile may be raised until the rear wheels B clear the runways 1.

Any suitable type of jack may be used. In the drawings I have shown each jack consisting of a post 30, a tubular guide 31 for said post, and toggles 32 for raising and lowering the post, the upper end of which latter is forked as indicated at 33 to constitute a saddle for the automobile axle or its housing C to sit in when jacked up. The toggles 32 are actuated by the tail gate 26 through the intermediacy of connecting bars 35, pivotally secured at their bifurcated forward ends to the toggle joints and having pin-and-slot connections 36 at their rear ends to lugs 37, carried by the tail gate 26.

When in raised position the tail gate is secured by a latch 34 engaging a pin 34ª on one of the runways.

The rear wheels B of the automobile may be geared to the traction wheels 4 by any suitable type of gearing. In the drawings I have shown the traction wheels 4 provided with spur rings 39, each intermeshing with a pinion 40 fixed upon a shaft 41 carrying another fixedly-mounted pinion 42, adapted to be driven by a spur ring 43, having arms 45 removably-secured to the spokes of the rear wheel B. The shafts 41 are journaled in brackets 44 secured to the runways 1.

48 designates a receptacle supported between the runways 1, for holding sand or other material to weight down the traction wheels 4, if necessary to keep them from slipping on the ground.

In practice the free end of the tail gate 26 is lowered to the ground, whereupon the automobile A is driven up said tail gate and into position upon the runways 1. The tail gate 26 is then raised and thereby actuates the jacks 27, causing them to raise the rear wheels B clear of the runways 1. When the wheels B are raised as described, their pinions 43 are brought into mesh with the pinions 42, hence when the rear wheels B are driven by the motor and transmission gear of the automobile, power is transmitted to the traction wheels 4 to propel the tractor, through the intermediacy of the gears 43, 42, 40 and 39. While the tractor in itself is comparatively light, the weight of the automobile thereon is ordinarily sufficient to prevent the wheels 4 from slipping upon the ground when the tractor is pulling a load.

From the foregoing description, it is apparent that I have provided a tractor which may be utilized to advantage in pulling agricultural machines, wagons, and various other kinds of vehicles, and while I have shown and described the preferred form of my invention, I reserve the right to make such changes in the construction, combination, and arrangement of parts as properly fall within the spirit and scope of the claims.

Having thus described my invention, what I claim and desire to secure by Letters Patent, is:

1. A tractor comprising a frame for carrying a self propelled vehicle, guide and traction ground members supporting the frame, a standard rising from the frame to extend alongside the self propelled vehicle, steering mechanism connected with the tractor guide members and anchored to said standard, and means for gearing the self propelled vehicle to the tractor to drive the same.

2. A tractor comprising a frame for carrying a self propelled vehicle, guide and traction ground members supporting the frame, a standard rising from the frame to extend alongside the self propelled vehicle, steering mechanism wholly independent of the vehicle steering mechanism connected with the tractor guide members and anchored to said standard, and means for gearing the self propelled vehicle to the tractor to drive the same.

3. A tractor comprising a frame for carrying a self propelled vehicle, guide and traction ground members supporting the frame, steering mechanism comprising worm and rod members, and a handle and carried by the frame at one side of the vehicle, whereby the tractor may be steered independently of the vehicle steering mechanism, means on the frame for supporting the said steering mechanism in a position accessible from the seat of the vehicle, and means for gearing the self propelled vehicle to the tractor to drive the same.

4. A tractor comprising a frame for carrying a self propelled vehicle, guide and traction ground members supporting the frame, steering mechanism at one side of the vehicle comprising a sectional rod having a universal joint, worm connection between one of the rod sections and the tractor guide member, a handle on another rod section, means supporting the last named rod section to locate said steering handle adjacent the seat of the self propelled vehicle, and means for gearing the self propelled vehicle to the tractor to drive the same.

5. A tractor comprising a frame for carrying a self propelled vehicle, guide and traction members for the frame, a standard rising from the side of the frame, a bracket on said standard, a shaft journaled on said bracket, a shaft having worm gear connection with the guide members of the tractor, universal joint connection between said shafts, and a handle on the first named shaft accessible from the seat of the vehicle whereby the tractor may be guided independently of the vehicle steering mechanism, and means for gearing the self propelled vehicle to the tractor to drive the same.

6. In a tractor, a frame for supporting a self propelled vehicle comprising traction mechanism, a vertically adjustable vehicle-engaging standard on the frame, a pair of toggle links connected at their inner ends one to the other and having the outer end of one link fastened to the frame and the outer end of the other link to the standard, a thrust rod connected to the links at their pivotal points and an actuating lever pivoted to the frame and to the thrust rod.

7. In a tractor, a frame for supporting a self-propelled vehicle, comprising guide and driving mechanisms, vertically movable members on the frame for engaging the vehicle to lift the same, toggle links connected with said members and with the frame, means for actuating said links to effect vertical movement of said members, and means for operatively connecting the driving mechanism of the vehicle with the driving mechanism of the frame.

8. A tractor comprising a frame supporting a self propelled vehicle and comprising guide and driving mechanism, vertically movable posts on the frame for engaging the vehicle to lift the same from the frame, toggle links connected with the posts and frame respectively, means for actuating said links to effect vertical movement of the posts, and means for operatively connecting the driving mechanism of the vehicle with the driving mechanism of the frame.

9. In a tractor, a frame for supporting a self propelled vehicle and comprising traction mechanism, vertically movable means on the frame for engaging the vehicle to raise the same from contact with the frame, a runway for conducting the vehicle onto the frame, and means operatively connecting the runway with said vertically movable means.

10. In a tractor, a frame for supporting a self propelled vehicle and comprising traction mechanism, vertically movable means on the frame for engaging the vehicle to raise the same from contact with the frame, a runway hingedly connected with the rear of said frame to conduct the vehicle onto the frame and movable vertically to form a tail gate for the frame, mechanism operatively connecting the runway with said vertically movable means to effect actuation of the latter.

11. A tractor comprising a frame for supporting a self propelled vehicle and comprising guide and driving mechanism, vertically movable posts on the frame for carrying the vehicle to lift the same from the frame, toggle links connected with the posts and frame respectively, a runway hingedly connected with the rear end of the frame and movable vertically to form a tail gate, a bar connecting the runway with the toggle links, whereby the links are straightened to raise the vehicle when the runway is raised and collapsed to lower the vehicle when the runway is lowered.

12. A tractor comprising a frame for supporting a self propelled vehicle and comprising guide and driving mechanism, vertically movable posts on the frame for carrying the vehicle to lift the same from the frame, toggle links connected with the posts and frame respectively, a runway hingedly connected with the rear end of the frame and movable vertically to form a tail gate, a bar connecting the runway with the toggle links, whereby the links are straightened to raise the vehicle when the runway is raised and collapsed to lower the vehicle when the runway is lowered, and means for locking the runway in elevated position.

13. A tractor comprising a frame for supporting a self propelled vehicle and comprising traction wheels, a spur ring on the traction wheels, brackets supported on the frame, shafts journaled on said brackets, pinions on said shafts, one of the pinions on each shaft meshing with the spur ring on a relative traction wheel and the other adapted for engagement by a pinion on a drive wheel of the self propelled vehicle, and means for raising the drive wheels of the vehicle to free them from the tractor frame and effect engagement of the pinions.

In testimony whereof I affix my signature, in the presence of two witnesses.

GEORGE H. SCULLY.

Witnesses:
F. G. FISCHER,
L. J. FISCHER.